United States Patent
Currey et al.

(10) Patent No.: US 11,537,720 B1
(45) Date of Patent: Dec. 27, 2022

(54) SECURITY CONFIGURATION OPTIMIZER SYSTEMS AND METHODS

(71) Applicant: Hashicorp, Inc., San Francisco, CA (US)

(72) Inventors: Jonathan James Currey, Berkeley, CA (US); Robert Earle McKinstry, III, Pittsburgh, PA (US); Armon Memaran Dadgar, San Francisco, CA (US)

(73) Assignee: HASHICORP, INC., San Francisco, CA (US)

( * ) Notice: Subject to any disclaimer, the term of this patent is extended or adjusted under 35 U.S.C. 154(b) by 0 days.

(21) Appl. No.: 16/421,007

(22) Filed: May 23, 2019

Related U.S. Application Data

(60) Provisional application No. 62/749,050, filed on Oct. 22, 2018.

(51) Int. Cl.
| | |
|---|---|
| *G06F 21/00* | (2013.01) |
| *G06F 21/57* | (2013.01) |
| *G06F 11/34* | (2006.01) |
| *G06F 21/71* | (2013.01) |

(52) U.S. Cl.
CPC ........ *G06F 21/577* (2013.01); *G06F 11/3476* (2013.01); *G06F 21/71* (2013.01); *G06F 2221/2141* (2013.01)

(58) Field of Classification Search
CPC .... G06F 21/577; G06F 11/3476; G06F 21/71; G06F 2221/2141
See application file for complete search history.

(56) References Cited

U.S. PATENT DOCUMENTS

| | | | | |
|---|---|---|---|---|
| 7,849,497 | B1 * | 12/2010 | Hurst | H04L 67/75 713/153 |
| 9,137,263 | B2 * | 9/2015 | Chari | H04L 63/102 |
| 10,645,122 | B2 * | 5/2020 | Purusothaman | H04L 63/0263 |
| 10,862,918 | B2 * | 12/2020 | Benyo | H04L 63/1433 |
| 10,931,682 | B2 * | 2/2021 | Ezra | H04L 63/108 |
| 2003/0115322 | A1 * | 6/2003 | Moriconi | G06F 21/6218 709/224 |
| 2004/0138957 | A1 * | 7/2004 | Bartolini | G06Q 99/00 705/26.1 |
| 2006/0150238 | A1 * | 7/2006 | D'Agostino | H04L 63/20 726/1 |
| 2006/0195896 | A1 * | 8/2006 | Fulp | H04L 63/0218 726/13 |

(Continued)

OTHER PUBLICATIONS

"Semantic-based Automated Reasoning for AWS Access Policies using SMT", Backes, John, et al., Formal Methods in Computer Aided Design, 2018.

*Primary Examiner* — Jeremy S Duffield
*Assistant Examiner* — Hassan A Hussein
(74) *Attorney, Agent, or Firm* — Kilpatrick Townsend & Stockton LLP

(57) ABSTRACT

Security configuration optimizer system and methods create optimized access control policies. The systems and methods analyze constraints on the secured system and produce a plurality of proposals for an updated security configuration. The proposals are analyzed and filtered. A resulting set of proposals are graded or ranked according to a variety of desirable outcomes. A proposal is selected according to criteria based on the balance of security and complexity. The security configuration is updated according to the selected proposal.

20 Claims, 9 Drawing Sheets

(56) References Cited

U.S. PATENT DOCUMENTS

| | | | |
|---|---|---|---|
| 2007/0180490 A1* | 8/2007 | Renzi | G06F 21/604 726/1 |
| 2008/0225753 A1* | 9/2008 | Khemani | H04L 63/20 370/255 |
| 2008/0301765 A1* | 12/2008 | Nicol | H04L 41/22 726/1 |
| 2008/0320549 A1* | 12/2008 | Bertino | G06F 21/604 726/1 |
| 2009/0300711 A1* | 12/2009 | Tokutani | G06F 21/6218 726/1 |
| 2010/0125911 A1* | 5/2010 | Bhaskaran | G06Q 10/10 715/781 |
| 2010/0192195 A1* | 7/2010 | Dunagan | G06F 21/577 726/1 |
| 2012/0011559 A1* | 1/2012 | Miettinen | G06F 21/31 726/1 |
| 2013/0055342 A1* | 2/2013 | Choi | G06F 21/577 726/1 |
| 2013/0097662 A1* | 4/2013 | Pearcy | H04L 63/20 726/1 |
| 2013/0219496 A1* | 8/2013 | Nie | H04L 63/1408 726/22 |
| 2013/0246995 A1* | 9/2013 | Ferrao | G06F 21/54 717/104 |
| 2014/0196104 A1* | 7/2014 | Chari | H04L 63/102 726/1 |
| 2015/0040229 A1* | 2/2015 | Chan | G06F 21/577 726/25 |
| 2015/0095979 A1* | 4/2015 | Windust | H04L 63/04 726/3 |
| 2015/0281277 A1* | 10/2015 | May | H04L 63/10 726/1 |
| 2016/0219077 A1* | 7/2016 | Pandya | H04L 41/0843 |
| 2017/0078322 A1* | 3/2017 | Seiver | H04L 63/1433 |
| 2017/0316215 A1* | 11/2017 | Hadzic | G06F 21/604 |
| 2018/0033009 A1* | 2/2018 | Goldman | G06Q 40/10 |
| 2019/0182287 A1* | 6/2019 | Hanley | H04L 63/20 |
| 2019/0334952 A1* | 10/2019 | Dhoble | H04L 63/10 |
| 2020/0007554 A1* | 1/2020 | Vincent | G06F 21/31 |
| 2020/0186416 A1* | 6/2020 | Hashimoto | H04L 41/0843 |
| 2020/0195693 A1* | 6/2020 | Price | G06F 21/552 |
| 2020/0226606 A1* | 7/2020 | Du | G06Q 20/405 |

* cited by examiner

|    | C1 | C2 | C3 | C4 | C5 | C6 |
|----|----|----|----|----|----|----|
| E1 | 0  | 0  | 1  | 1  | 0  | 1  |
| E2 | 0  | 1  | 1  | 0  | 0  | 1  |
| E3 | 0  | 1  | 0  | 0  | 0  | 0  |
| E4 | 0  | 0  | 1  | 1  | 0  | 1  |
| E5 | 0  | 0  | 1  | 1  | 0  | 1  |
| E6 | 0  | 1  | 0  | 0  | 0  | 0  |

Group 1 has Policy 1
Group 2 has Policy 2
Group 3 has Policy 3

Fig. 5A

|    | C1 | C2 | C3 | C4 | C5 | C6 |
|----|----|----|----|----|----|----|
| E1 | 0  | 0  | 1  | 1  | 0  | 1  |
| E2 | 0  | 1  | 1  | 0  | 0  | 1  |
| E3 | 0  | 1  | 0  | 0  | 0  | 0  |
| E4 | 0  | 0  | 1  | 1  | 0  | 1  |
| E5 | 0  | 0  | 1  | 1  | 0  | 1  |
| E6 | 0  | 1  | 0  | 0  | 0  | 0  |

Group 5 has Policy 5
Group 6 has Policy 6
Group 7 has Policy 7
Group 8 has Policy 8
Group 4 has Policy 4

Fig. 5B

SECURITY CONFIGURATION OPTIMIZER SYSTEMS AND METHODS

CROSS-REFERENCES TO RELATED APPLICATIONS

This application claims priority of U.S. provisional application Ser. No. 62/749,050 filed Oct. 22, 2018 and titled "Security Configuration Optimizer Systems and Methods" by the present inventors.

BACKGROUND

A central component of computer security is access management, that is, the management of authorizations and denials with regard to accessing particular parts of a computer system being managed. Entities attempting to access the computer system are referred to as security principals. A security principal may be a human user, a software application or another computer system. A security principal may also be groups of human users, software applications or computer systems. To successfully access the managed computer system, a security principal is typically authorized with the privileges that are required by the security principal to carry out its legitimate purpose. These privileges are referred to as "required privileges". Preferably, a security principal is authorized to have only the required privileges, and no more. Any additional privileges beyond the required privileges constitute unnecessary risk to the security of the managed computer system. The additional privileges, also referred to as "optional privileges", could be exploited if the security principal is compromised or acts maliciously. It follows that reducing or removing this unnecessary risk increases computer security. Risk reduction by limiting authorizations is referred to as reducing the attack surface of a secured computer system.

Typically, however, a reduction of unnecessary risk is related to an increase in complexity of the system's security configuration. The security configuration is a part of the system configuration that governs access management. A security configuration that reduces or eliminates unnecessary risk is often more complex than a configuration that allows more unnecessary risk, since reducing risk typically requires authorizations to be manipulated in a more fine-grained manner.

More complex configurations are less attractive to system administrators as complex configurations are harder to reason about. In particular, a more complex configuration generally makes it harder to verify whether a new change would remove authorization for a required privilege. Accidentally revoking (deauthorizing) a required privilege could lead to disruption of the operation of the system, which is typically something to be strenuously avoided. Accordingly, system administrators often err on the side of increased authorizations and reduced complexity, and choose a configuration that has some unnecessary risk in order to avoid accidentally revoking required privileges.

It remains desirable to have security configuration optimizer systems and methods for creating and implementing secure access control configurations in complex computer systems.

SUMMARY

Security optimizer systems and methods enable creating and selecting optimized access security configuration components that balance a plurality of qualities including system configuration complexity and risk without revoking required privileges. In general, the systems and methods analyze constraints on the secured system and produce a plurality of proposals for an updated security configuration. The proposals are filtered and the resulting set of proposals are graded or ranked according to a variety of desirable properties. A proposal is selected according to criteria based on, for example, the balance of security and complexity.

Embodiments of the security configuration optimization methods include a computer implemented method for configuring a secured system that generates a first plurality of proposals for a security configuration for the secured system, where each proposal in the first plurality includes required privileges for accessing the secured system by at least one principal, and at least one proposal of the first plurality has required privileges and the remaining proposals of the first plurality have required privileges and optional privileges. Next each proposal in the first plurality of proposals is scored where the score indicates proposal fitness. The first plurality of proposal is then filtered to produce a second plurality of proposals, where the proposals in the second plurality are fewer in number than the proposals in the first plurality. Each proposal in the second plurality is then evaluated using proposal metrics for risk and complexity and this is used to produce a third plurality of proposals. A proposal from the third plurality is selected to be implemented in a secured system.

In an alternative embodiment, the step of generating a first plurality of proposals further includes generating the first plurality of proposals from a plurality of constraints on at least one principal. In second alternative embodiment, the step of generating a first plurality of proposals further includes generating the first plurality of proposals from usage data of the secured system.

In a further alternative embodiment, filtering includes a plurality of filters that are executed sequentially. In an alternative arrangement, filtering includes a plurality of filters that are executed in parallel.

In a still further alternative embodiment, the second plurality of proposals is ranked. In a first alternative arrangement, the ranking is executed according to ranking metrics selected from the group consisting of unnecessary risk, complexity according to number of path rules, complexity according to number of policies and proposal coherence. In a second alternative arrangement, the ranking is executed according to a metric developed from usage data of the secured system.

In another alternative embodiment, the step of selecting a proposal from the third plurality of proposals includes selecting a proposal having a particular score. In another alternative embodiment, scoring is performed according to unnecessary risk included in each proposal in the first plurality of proposals.

Further embodiments include a non-transitory computer-readable storage medium storing a computer program, that when executed by at least one processor causes the at least one processor to perform a method for configuring a secured system including generating a first plurality of proposals for a security configuration for the secured system. Each proposal in the first plurality includes required privileges for accessing the secured system by at least one principal. At least one proposal of the first plurality has required privileges and the remaining proposals of the first plurality have required privileges and optional privileges. Each proposal in the first plurality of proposals is scored and the score indicates proposal fitness. The first plurality of proposals is filtered to produce a second plurality of proposals. The proposals in the second plurality are fewer in number than the proposals in the first plurality. Each proposal in the second plurality is evaluated using the proposal scores. The proposals in the second plurality are evaluated for risk and complexity to produce a third plurality of proposals. A proposal from the third plurality of proposals is selected for implementation in the secured system.

In an alternative embodiment, the at least one processor executes the step of generating the first plurality of proposals from a plurality of constraints on at least one principal. In an alternative arrangement, the first plurality of proposals are generated from usage data of the secured system.

In a further alternative embodiment, the filtering step includes a plurality of filters that are executed sequentially. In an alternative arrangement, the filters are executed in parallel.

In a further alternative embodiment, the proposals in the second plurality of proposals are ranked. In one arrangement, the ranking is executed according to ranking metrics selected from the group consisting of unnecessary risk, complexity according to number of path rules, complexity according to number of policies and proposal coherence. In a second arrangement, the ranking is executed according to a metric developed from usage data of the secured system. In a further alternative embodiment, a proposal is selected from the third plurality according to a particular score. In a further alternative embodiment, scoring includes scoring according to unnecessary risk included in each proposal in the first plurality of proposals.

Further embodiments include a computing system for configuring secured systems, the computing system including a data store storing a plurality of proposals, where each proposal holds a different combination of privileges to implement a security configuration of a secured system. The computing system further includes at least one processor coupled to the data storage system and configured to perform a plurality of steps. The steps include scoring each proposal in the first plurality of proposals, the score to indicate proposal fitness. The steps further include filtering the first plurality of proposals to produce a second plurality of proposals, where the proposals in the second plurality are fewer in number than the proposals in the first plurality. The steps also includes evaluating, using the proposal metrics, each proposal in the second plurality of proposals for risk and complexity to produce a third plurality of proposals. The steps include selecting a proposal from the third plurality of proposals to implement in the secured system.

The present invention together with the above and other advantages may best be understood from the following detailed description of the embodiments of the invention illustrated in the drawings, wherein:

DRAWINGS

FIG. 5A-5B shows matrices of security principals and privileges used in embodiments of the invention;

DESCRIPTION

Embodiments of a security configuration optimizer system and method are part of managing computer security. The security configuration optimizer systems and methods identify and evaluate potential changes to the secured system's security configuration. The evaluation includes consideration of unnecessary risk and/or complexity and, in one alternative embodiment, also includes consideration of changes that preserve required privileges. The security configuration optimizer systems and methods compare the authorized privileges to those that are required. The delta between the authorized and required privileges are optional privileges, that represents the unnecessary risk of a security configuration. The security configuration optimizer systems and methods operate with a goal of reducing unnecessary risk. The security configuration optimizer systems and methods generate sets of proposals, where each proposal represents a different combination of changes that could be made to the security configuration of a secured system. Each proposal is scored according to a set of proposal metrics that includes measures of the unnecessary risk and complexity of the configuration that would result if that proposal were implemented.

The security configuration optimizer system generates a large set of proposals, whose number is reduced by filtering. The set of filtered proposals are preferably the best proposals from the initial set of proposals and are preferably distinct from one another in terms of the balance of unnecessary risk versus configuration complexity. In some embodiments, the filtered proposals are ranked. The filtered proposals are evaluated for selection. The secured system is then reconfigured according to a selected proposal.

Figure 1:
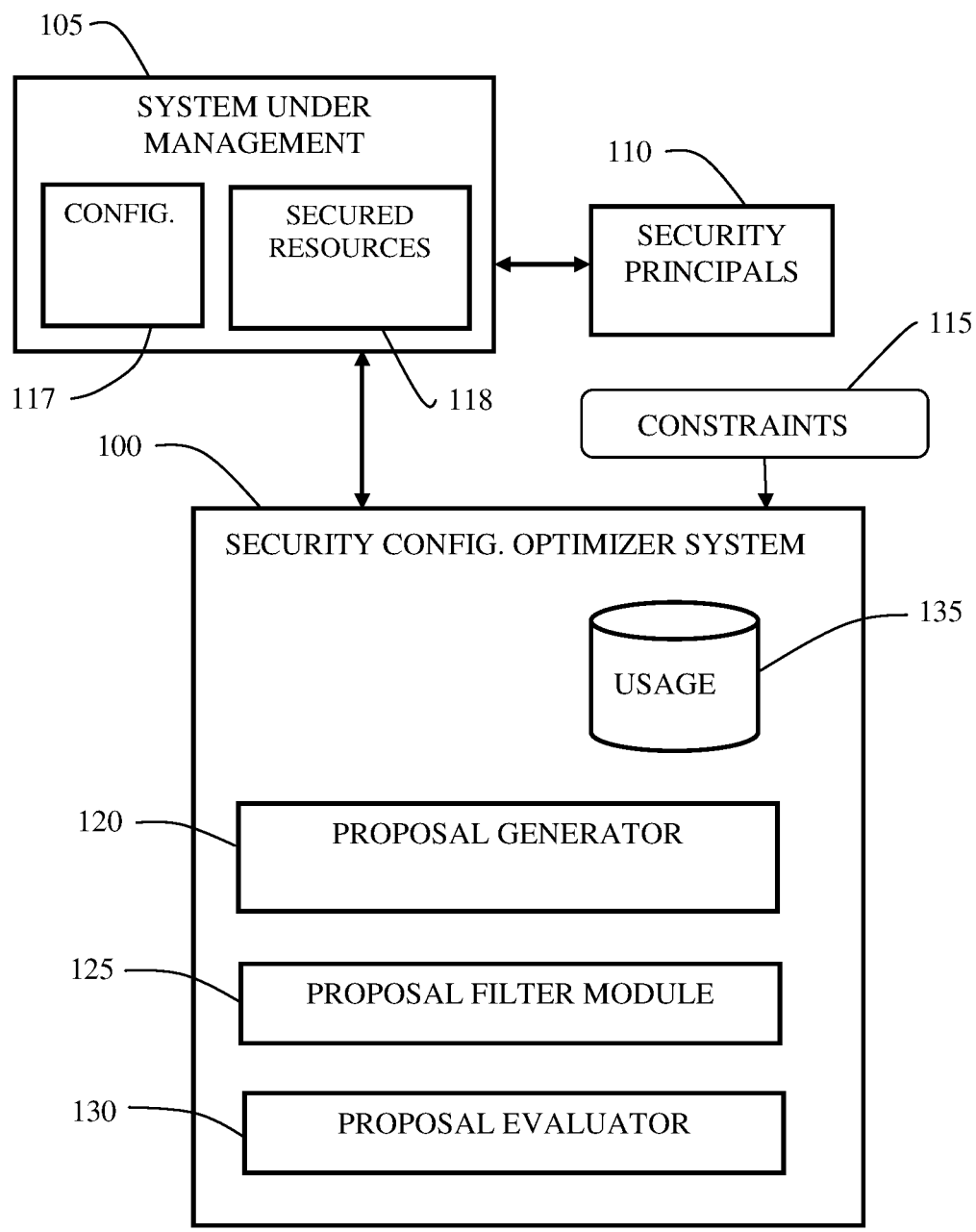
FIG. 1 is a block diagram of an embodiment of a security configuration optimizer system.

FIG. 1 is a block diagram of an embodiment of the security configuration optimizer system. The security configuration optimizer system 100 secures a computer system under management (also referred to as the "secured system") 105 by managing access by security principals 110. The secured system 105 has a current security configuration ("current configuration") 117 and a plurality of secured resources 118. The security configuration optimizer system 100 includes a proposal generator 120, a filter module 125 and a proposal evaluator 130. In an alternative embodiment, the security configuration optimizer system 100 further includes a usage database 135. In some embodiments, the security configuration optimizer system 100 receives input from a constraints structure 115.

The secured system 105 is, for example, a computer. The secured system 105 may alternatively be a collection of computer systems that can interoperate or communicate. A security principal (also referred to as a "principal" or an "entity") 110 is, for example, a user of the secured system 105 or, alternatively, the principal 110 is a system component such as an application, machine or service. Typically a secured system has many principals attempting access where these principals are a combination of users, system components and computer systems. The security configuration optimizer system 100 may be hosted on one or more general-purpose computers under the control of a suitable operating system. The constraints structure 115 contains, for example, data and other information to constrain the proposal generator 120 to emit proposals with particular properties.

The system under management (secured system 105 generally has a plurality of secured resources 118. One example of a secured resource in the system under management 105 is referred to as a "secret." A secret is an object for which access is controlled for security reasons. Every secret has the following properties: (1) A secret path (aka just path), which is analogous to a file path in a computer file system: A human-readable string that uniquely identifies that secret. The path may contain "/" characters, which are interpreted as grouping all secrets whose path is the same to the left of that "/" as being in the same "directory" (or in different sub-directories that share one or more common parent directories). For example the secrets with paths/a/b/c and/ a/b/d are both conceptually in the same directory/a/b/. Whereas /a/b/c and/a/b/d/e are in different directories (/a/b/ and/a/b/d, respectively) but share the same common directories/a/and/a/b/). (2) Zero or more key-values pairs. where each key is a string with significance to the entities that access that secret, and the associated value is some potentially sensitive piece of information such as a username, password, encryption key etc. The paths of different secrets are typically chosen to have a hierarchical structure, like a file path in a file system, in order to allow them to be managed in groups. A privilege is defined as the permission to perform a specific action upon a specific secured resource. An example of a privilege is the permission to read the credentials (username and password) for a particular database. Other privileged actions include, for example, Create, Read, Update, List and Delete. An authorization is approval for a particular principal to use a particular privilege. Adding an authorization to the security configuration of the system under management 105 authorizes the specified principal for the specified privilege. Removing an authorization from the configuration deauthorizes the principal for the privilege. A denial is a prohibition of a particular principal to use a particular privilege. In the present embodiment, denials take precedence over authorizations, however, in alternative embodiments, it may be the reverse. In the present embodiment, if the security configuration optimizer system 100 is presented with a security configuration that includes both a denial and an authorization for the same principal and privilege, it will remove the authorization and preserve the denial. A constraint is a required authorization or a required denial governing the access by a principal 110 to a particular part of the secured system 105. The system under management 105 also has a current configuration 117. The current configuration 117 includes a set of configuration components that collectively enable or deny certain privileges for certain principles. The constraints structure 115 holds constraint information. In various alternative embodiments, the constraints information is obtained, for example from the principals or from system administrators. Constraints may also be derived from the privileges assigned to a subset of principals active in the secured system 105. Other sources of constraint information are possible within the scope of the invention.

In a first embodiment, each execution of the proposal generator 120 takes a set of constraints (also referred to as "proposal constraints") as input. The security configuration optimizer system 100 receives the constraints as input from the constraints structure 115. The security optimizer system 100 generates a set of proposals (also referred to as a "proposal set") using the received constraints and the current configuration 117 of the secured system 105. Each of the proposals in the set satisfies the constraints. Each proposal corresponds to an alternative way to change a subset of the secured system's security configuration. Typically, the proposal set covers a plurality of alternative configurations to implement the required privileges while minimizing risk. In an alternative embodiment, constraints are defined using usage data from the secured system 105. In a further alternative embodiment, the usage data from the secured system 105 is stored in the usage database 135. In this embodiment, the constraints are defined at least in part with data from the usage database 135. The proposal generator 120 also scores the proposals in the set as described below.

The filter module 125 uses one or more filters on the proposals generated by the generator 120. The proposal generator 120 may potentially generate a proposal set that contains a large number of proposals (if the particular proposal constraints have a structure that supports many alternative solutions). The large number of proposals can be expensive to store and to transmit. Further some proposals may be dominated by one or more other proposals and may therefore be redundant. To reduce the number of proposals to make the process of evaluation more efficient, one or more proposal filters may be applied to the proposal set output by the proposal generator 120.

The proposal evaluator 130 evaluates the filtered proposals and selects a proposal to use in reconfiguring the secured system 105. In a first embodiment, the proposal evaluator 130 uses a set of rules, described later in this documents, to determine if one of the filtered proposals will be particularly effective in securing the system while preserving required authorizations. If the rules are not satisfied, the proposal evaluator 130 may then pass the proposals for manual review by a user. In one arrangement, the proposal evaluator 130 annotates the proposals (and the overall proposal set) with additional metadata to indicate why the proposal evaluator 130 arrived at its decision. This metadata can be used to assist in the manual evaluation process, or to assist verification in for example, an audit by a user/administrator of a choice made by the proposal evaluator. In an alternative embodiment, the proposals are not evaluated.

In an alternative embodiment, the security configuration optimizer system 100 includes a usage database 135. The usage database (alternatively referred to as the "privilege use database") 135 records information about the use of the system under management 105. In a basic implementation, the information recorded includes the privileges that have been used by each security principal 110. The security configuration optimizer system 100 can, for example, use the usage information as an indicator of what authorizations are required. The use information to populate the privilege use database 135 may be obtained by one or more of a number of methods including a special method that may be added to the system under management 105. The information may be pushed to the database 135 by the system under management 105 or pulled from the system under management 105 by the security configuration optimizer system 100. The information may be updated at the time each use occurs (synchronously or asynchronously) or later, and/or in batches. In one implementation, the privilege use database 135 can give a measure of how much variation over time occurred in the usage information to which the privilege use database 135 was given access. This variation data can be used to give a measure of confidence that the security configuration optimizer system 100 has seen enough usage information to have a reliable view of required privileges. In one embodiment, the privilege use database 135 stores only the set of privileges that have been used by each principal. As an optimization, the database 135 can begin empty, and an entry is only added for an entity the first time it uses any of the privileges, so that looking up a principal in the database 135 and finding no entries can be taken to mean that that principal has not used any privileges. Similarly, if a database entry for a principal fails to include a particular privilege in its set of privileges, it can be taken to mean that the principal has not used that privilege. In another embodiment, a count is stored for each principal-privilege pair, indicating how many times that privilege has been used by that principal. The count starts at zero, and is incremented once for each use of that privilege by that principal. An optimization can be made where zero counts are not stored in the database, and an entry is only added for a particular privilege-entity pair the first time use is detected, with the count being set to one. In another alternative embodiment, the database 135 is reset at the end of an "epoch", which may be a fixed interval of time, or could occur when an event occurs such as a change to the security configuration. The information from previous epochs is still relevant and is retained. Analyzing the usage from different epochs can give an indication of whether a pattern of behavior has begun only recently, has been ongoing for some time or has ended.

Figure 2:
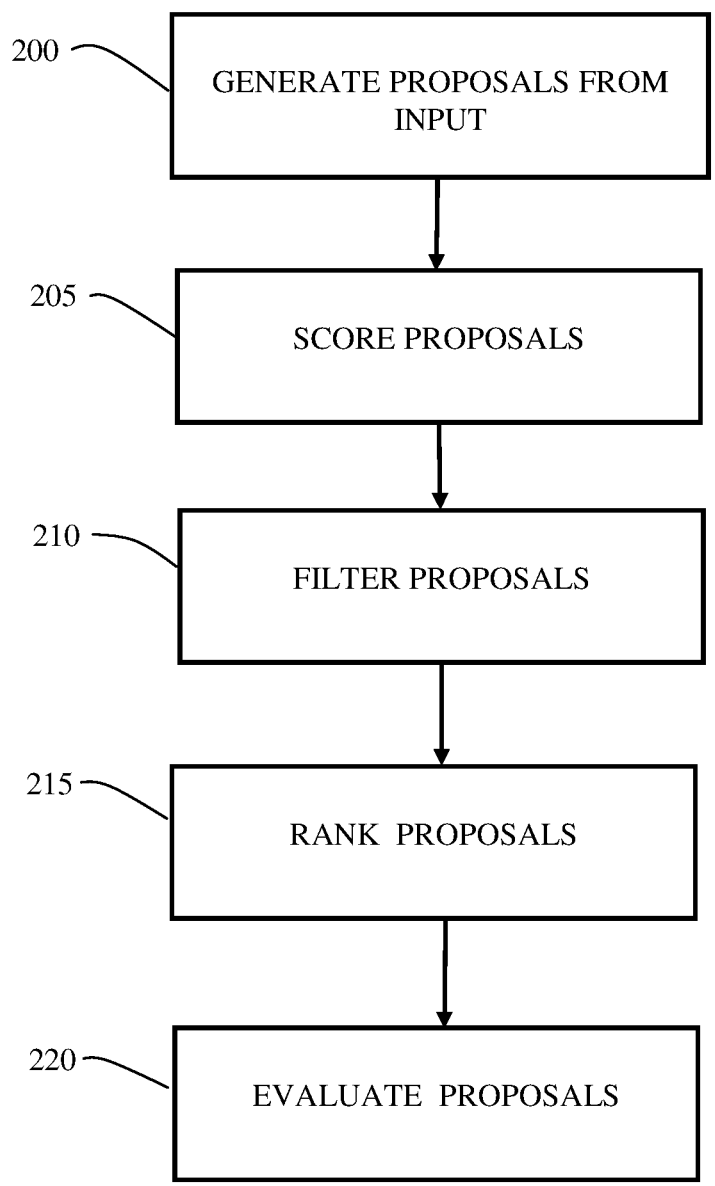
FIG. 2 is a flow chart of an exemplary method of a security configuration optimizer such as the system of FIG. 1.

FIG. 2 is a flow chart of an exemplary process implemented in a security configuration optimizer system such as that shown in FIG. 1. An understanding of an exemplary process of granting authorization to a security principal informs the understanding of the operation of the security configuration optimizer system 100. When deciding if a security principal 100 is authorized to use a particular privilege, the security configuration optimizer system 100 considers the complete set of security configuration components that affects that security principal. This is referred to in this example to as the "effective policy" for that entity. A policy is made up of zero or more path rules. Each path rule has the following properties, which can be thought of as describing a set of constraints: (1) One "path rules" path (also referred to as a "policy path"). These generally are similar to the secret paths associated with secrets. Unlike secret paths, however, a policy path may be either globbed or unglobbed. (2) An unglobbed path rules path (aka unglobbed path) is similar to a secret path, and matches only the secret with the same path (if one currently exists). (3) A globbed path rules path has a "*" (wildcard) character at the end of its path, and may match any number of secrets. The globbed path matches every secret in existence where the secret path begins with the globbed path rules path (excluding the * at the end). That is, it matches every secret for which the globbed path rules path (minus the * on the end) is a prefix of the secret path. (4) Zero or more capabilities, where a capability is one of: Create, Read, Update, Delete, List, Deny and Sudo.

Considered in isolation, each path rules authorizes all of its specified capabilities on all of the secrets that match its path. So for example, if a policy called Policy 1 is defined as follows: //Policy 1, with a single path rules entry path /a/b/* ["Create", "Read"] and the following secrets exist:
/a/b
/a/b/c
/a/b/d
/a/e/f then any entity assigned Policy 1 is authorized for the Create and Read capabilities on secrets /a/b, /a/b/c, and/a/b/d, but not on/a/e/f. One can say that/a/e/f is out of scope for (or not covered by) the single path rules instance within Policy 1, and out of scope of Policy 1 itself. The other secrets are in scope for, that is, covered, by the path rules instance and hence Policy 1.

Whether a particular entity is authorized for a particular privilege is determined by considering the effective policy resulting from all the polices currently assigned to that entity. The effective policy is calculated by taking the union of all path rules from all the policies assigned to that entity. If one of the capabilities included in a path rules instance is Deny, all other capabilities in that path rules instance are ignored, and the path rules instance is added to a list of deny path rules.

The effective policy is used as follows: (1) When an entity tries to use a particular privilege on a particular secret, if the path of the secret matches any of the deny path rules (either exactly, for a non-globbed path rules path, or as a prefix for a globbed path rules path), then the operation (using that privilege on that secret) is denied. i.e. it is blocked and fails with an error returned to the calling entity. (2) If none of the deny path rules matches the secret path, the secret path is then compared to the non-deny path rules within the effective policy. The path rules are considered in order of their path length (from longest to shortest). If any path rules matches both the secret path and privilege of the operation being attempted, the operation is allowed to proceed. If all path rules are considered without such a match being found, the operation is denied.

Two entities may be assigned the same policy, which by itself authorizes a certain operation on a certain secret, but if one of the entities is additionally assigned another policy as well, and that policy includes a path rules instance that includes the Deny privilege, and the path of that path rules instance matches the path of that secret, then the entity assigned that additional policy will be denied if it tries to perform that operation. Therefore, the complete set of polices assigned to an entity must be considered (by way of constructing the effective policy that corresponds to that set of policies) to determine if that entity may perform that operation on that secret.

The effective policy merges the path rules from all the policies assigned to the security principal. The merge process uses the following example precedence rules to resolve cases where multiple path rules match the secret the entity is seeking to use: longest matching wild-carded prefix wins, provided neither path rule includes the "deny" privilege; the "deny" privilege takes precedence, even over a longer matching wild-carded prefix from another path rule. Accordingly, if the effective policy contains both authorization and denial for the same secret, the denial prevails and blocks all other capabilities on that secret.

In this embodiment, the privileges are checked every time a security principal attempts to use an authorization. This is a preferred operation because secrets may be added to or removed from the secured system at any time. Accordingly, the set of privileges granted to a security principal is a function of the secrets in existence at the time the privileges are checked, as well as of the contents of the security configuration components assigned to that security principal. The set of privileges granted to a security principal may change over time. The same policy can grant zero, one or many privileges, depending on the secrets in existence in the system.

As the example above demonstrates, the elements of a system's security configuration components can be complex, and the particular semantics of the security configuration can have significant and non-obvious effects on the resulting authorizations and denials. Generally, the security configuration optimizer system considers a system's security configuration components via the use of two transformation operations. A transform referred to as ConfigToAuthorization transforms a set of security configuration components (such as a set of policies (each with associated assignments to entities), into corresponding authorizations and denials. A transform referred to as AuthorizationToConfig transforms a set of authorizations and denials into a corresponding set of security configuration components (such as a set of policies, each policy with associated assignments to security principals).

In order to produce an effective proposal set for a security configuration for the secured system 100, the security configuration optimizer system operates, for example, as follows.

At step 200 of FIG. 2, the proposal generator 120 takes a plurality of constraints as input. In an alternative embodiment, the proposal generator 120 takes a plurality of constraints and usage data as input. The proposal generator 120 generates a plurality of proposals from the input where each proposal satisfies the constraints. The structure of a proposal is system-specific, and based on that system's security configuration components and the way the security configuration components relate to the system-specific equivalent of principals and privileges. For example, each proposal may be a set of policies, with each policy accompanied by a set of assignments of that particular policy to a particular security principal. At step 205, each generated proposal is scored according to the process described below with regard to FIG. 3.

At step 210, the proposals are filtered. The proposal generator typically generates a proposal set that contains a large number of proposals. To reduce the number of proposals to a more manageable level, generally for system efficiency reasons, one or more filters are applied to the proposal set output by the proposal generator. The filters are, for example, executed in sequence, with the proposal set output by one filter forming the input to the next filter. Other filter schema are possible within the scope of the invention. The filters could alternatively be executed in parallel. In a further alternative embodiment, a first set of filters are executed in parallel and the output then filtered by one or more additional filters.

The filter in one embodiment is referred to as a "Suboptimal Proposal" filter, which filters out a proposal if there is another proposal that is strictly superior to it. One implementation of this filter applies the concept of strict dominance from game theory, and adapts the technique of iterative Elimination of Strictly Dominated Strategies (ESDS).

In another embodiment, a filter considers the vector of metrics values for one proposal as a point in N-dimensional space, and calculates the convex hull of the points. Proposals not on the hull are suboptimal and can be filtered out.

In another embodiment, a filter referred to as a "Distinct Proposal" filter, selects a subset of proposals that are distinct from one another, in the sense that the proposals are reasonably far apart in the metric space and represent the range of choice available across the entire space of generated proposals. When this condition is satisfied, each of the retained proposals is representative of a different region of the metric space, and hence the filtered proposals collectively represent the range of possible choices to make.

A still further embodiment is filtering by clustering, for example, by k-means, and then selecting one proposal from each cluster. Other types of clustering are possible within the scope of the present invention. The proposal selected from each cluster is preferably on or near the edge of the cluster closest to the origin of the metric space, rather than being its centroid or another point further from the origin, since points further from the origin are worse, that is, they correspond to higher scores.

In another alternative embodiment, the distinct filter uses bounding curve approximation. The proposals are projected as P points on a 2D scatter plot, and approximations are found for the curve that bounds the points from below, separating them from the origin ('the bounding curve'). k-point approximations to the bounding curve are found iteratively for values of k starting at 2 and increasing. A k-point approximation consists of k points drawn from the P points. The k points are ordered by their value on either one of the axes, and connected in order by k−1 straight line segments. The approximation is assigned an error, E, by summing the number of the points from P that fall below the k−1 straight line segments (i.e. that lie between a line segment and the origin of the 2D plot). A lower value for E indicates a higher quality (better) approximation. The choice of points for each value of k can be made either exhaustively or greedily. In the exhaustive case, every discernable combination of k points drawn from P is considered, and a set with equal lowest error E is selected. Because generally all combinations are considered, the set chosen is believed to be optimal (have the lowest possible value for E). The exhaustive approach is more suitable when the number of points P is relatively low. One possible greedy approach to choosing k points is to start from the points chosen for the k−1 point approximation, and to try inserting the kth point in between each pair of neighboring k−1 points. The points that the kth point is inserted between may or may not be allowed to move in response to the insertion of the new point (by selecting other proposals from P for those points). The set of k points with the lowest error E is chosen, but as not all combinations of k points drawn from P are considered, the value for E is not guaranteed to be the absolute minimum. The greedy approach is more suitable when the number of points P is very large, for example several hunder or more points. The largest value of k to consider ('Highest-k') can be found in a variety of ways. If the lowest value of E found for a value of k is zero, larger values of k need not be examined, as adding additional points cannot further improve the approximation. An upper limit for k ('Max-k') can also be hardcoded or specified by the user, and iteration can stop if that value is reached before E reaches zero. Once Highest-k is reached and iteration terminates, the value of k to use for output ('Output-k') must be selected. If Highest-k is less than or equal to Max-k, Highest-k can be used as the value of Output-k. Otherwise, Max-k may be used. Alternatively, the decline in the lowest value of E found for successive values of k can be examined, with Output-k set to the value of k for which (Min-E(k−1)−Min-E(k)) or (Min-E(k−1)/Min-E(k)) falls below some threshold. The k points selected for k=Output-k represent the distinct proposals not to be filtered out, with all the proposals corresponding to the other (P−Output-k) points being filtered out.

Another alternative filter is naive sampling at intervals on the x- or y-axis of the same 2D scatter plot, or every N points.

In further alternatives, filters may be combined.

At step 215, the filtered proposals are ranked. Filtered proposals are ranked before being presented for evaluation.

In a first embodiment, the proposal metrics are ordered, from most important to least important, and proposals are sorted by the first (most important) ranking metric, lowest value first, with ties in the value of that first ranking metric being resolved by sorting on the second ranking metric. The tiebreaking can continue down the list of ranking metrics until the metrics have all been compared. If a tie still occurs, the proposal created first can be ranked higher.

An example order of ranking metrics is as follows:
1. Unnecessary Risk.
2. Complexity (Variant 2) Total number of path rules in all the policies in the proposal.
3. Complexity (Variant 1) Number of policies in the proposal.
4. Proposal Coherence (Variant 1 or 2) The sum or average of the edit distances between the secret paths of all the capabilities authorized by that policy.

A different order of ranking metrics is possible within the scope of the invention. In an alternative embodiment, the order could also be learned by the security configuration optimizer system, for example by observing which proposals are chosen, or by asking users to choose between pairs of proposals.

At step 220, the proposal evaluator evaluates the ranked proposals to determine whether any of the proposals are suitable. The operation of the proposal evaluator is now described. The proposal evaluator uses sets of rules to determine if one of the filtered proposals is good enough to implement. In some embodiments, the proposal evaluator annotates the proposals (and the overall proposal set) with additional metadata to indicate why it arrived at its decision. This metadata can be used to assist after the fact validate of its decision to automatically implement a certain proposal.

Possible heuristics that the proposal evaluator can use include:
- Finding the proposal that has the lowest overall metrics values. This can be achieved by computing a proposal score using all of the available metrics, after normalizing the different metric values. The proposal with the lowest score is selected automatically (perhaps only if other conditions are satisfied, such as the project that the associated security configuration components belong to being approved for automated configuration updates.)
- As a refinement, the delta between the proposal scores produced in the scoring step is considered, with the lowest scoring proposal only applied automatically if its score is more than a certain amount lower than the next lowest scoring proposal and/or the current configuration.

Figure 3:
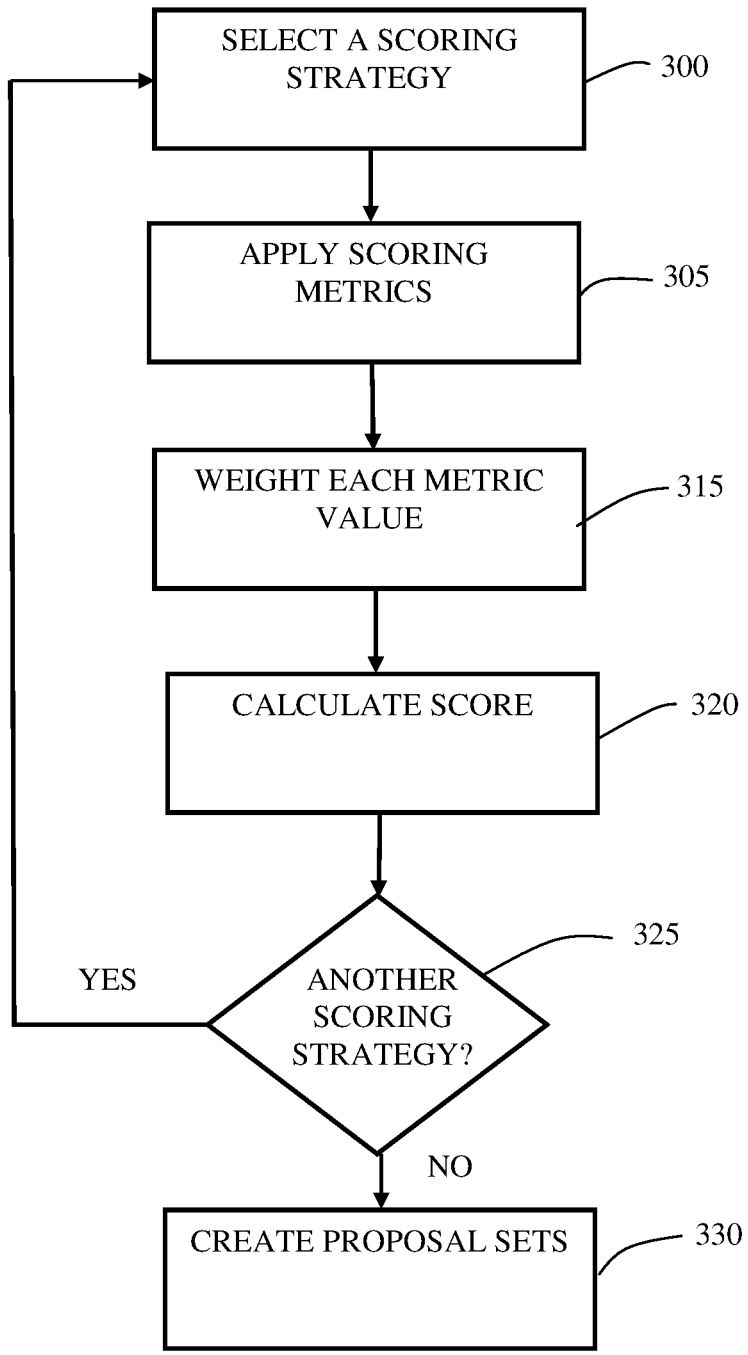
FIG. 3 is a flow chart of an exemplary scoring process according to principles of the invention.

FIG. 3 is a flow chart of the method of scoring. The security configuration optimizer system uses a plurality of proposal metrics to analyze the fitness of each proposal (in absolute terms or relative terms to other proposals) in being successfully implemented as the configuration of the secured system. The proposal metrics may be used to qualify a proposal in a number of ways. In a first example, the proposal metrics guide an exploration of the space of possible proposals in some embodiments of proposal generation. In a second example, the proposal metrics are used to determine which proposals to include in the proposal generator's output. In a third example, the proposal metrics are used to provide data to subsequent operations of the security configuration optimizer system.

A variety of proposal metrics may be used in successful operation of the security configuration optimizer system, but typically the proposal metrics include measures of the complexity and of unnecessary risk associated with a proposal. In one example embodiment, a plurality of proposal metrics that provide alternative measures of the same property may be included to assist the proposal decision making process. Proposal metrics may be a combination of system-specific and generic. In the present embodiment, all proposal metrics have the same "good direction", with lower values being better and zero being ideal. Other arrangements are possible within the scope of the invention.

An example set of proposal metrics includes: Unnecessary Risk which is the number of privileges authorized by the policies that are not included in the required authorizations; Proposal Complexity (Variant 1) which is the number of policies in the proposal; and Proposal Complexity (Variant 2) which is the total number of path rules in all the policies in the proposal. Other example proposal metrics include the following. Privilege Distance (Variant 1) which is the sum of the privilege distances for each of the policies in the proposal where the policy privilege distance is the sum of the pairwise edit distances between the secret paths of all the privileges that are authorized by that policy. This is used as a measure of the extent to which the authorizations a policy grants form a unified whole. It is, however, only useful when the system administrators feel that the hierarchical structure of the secret paths is well organized. Another possible proposal metric is Privilege Distance (Variant 2) which is the average of the same edit distances. This variant removes consideration of the number of capabilities authorized by each policy. This proposal metric makes the same assumption about the secret paths being well-structured. Other proposal metrics are possible within the scope of the invention.

Since the proposal metrics are generally not directly comparable, a proposal score is implemented. The proposal score may be derived from the full set of proposal metrics or a subset of them. In the present embodiment, a lower proposal score is defined to be better, with zero being ideal. In alternative embodiments, proposal metrics are combined non-linearly. The proposal generator computes the proposal score by taking a linear combination of the metrics values for that proposal. The contribution each metric makes to the score is weighted. In a first embodiment, each metric has one weight defined for it. In a second embodiment, each metric has two weights associated with it. One of these weights is a "metric balance weight" to allow the contribution of each metric to proposal decision-making to be controlled. The second of these weights is a "metric normalization weight" to compensate for the different scales of the different metrics. The combined effect of the two kinds of weight is achieved by multiplying the metric value by both of them.

One method used by the proposal generator to compute the metric normalization weights is to keep track of max(m) (the maximum value encountered for each metric m), and use the inverse of the max value (1/max(m)) as the normalization weight. The max value may be computed per proposal set (by computing the individual metrics for all proposals, before going back and computing the proposal score for each proposal), or maintained across multiple proposal sets. Other ways of normalizing each metric's value may be used, including methods that take the distribution of occurring values into consideration, such as normalizing with respect to the mean, median or 90th percentile occurring value for that metric.

Collectively the state described in the previous section (a set of metrics, plus per-metric weights—either a simple weight or a balance weight plus a normalization weight) defines a particular "proposal scoring strategy" for the proposal generator. The scoring strategy controls how the proposal generator explores the space of possible proposals, and which ones the proposal generator chooses to include in its output proposal set.

At step 300, the proposal generator selects a first scoring strategy. The proposal generator runs multiple analyses on the proposals it generates, each using a different scoring strategy. Doing so allows proposals to be discovered that may offer novel tradeoffs between the different proposal metrics, but that would not be found via a single search. This might be the case because the novel tradeoffs are only discoverable after visiting another proposal that scores poorly according to the first scoring strategy, or because the unusual proposals would be discarded in favor of another proposal that represents a local minimum according to the first scoring strategy.

At step 305, the proposal generator applies a specified set of proposal metrics associated with the selected scoring strategy.

At step 315, the proposal generator applies a set of weights to the set of proposal metrics in accordance with the selected scoring strategy.

At step 320, the score for each proposal is calculated using the selected scoring strategy.

At step 325, the proposal generator determines whether there are more scoring strategies to apply. If yes, the proposal generator returns to step 300. If no, then the proposal generator creates a proposal set to pass to the proposal filter module, step 330.

An example of scoring via a plurality of scoring strategies is as follows. For example, specifying Unnecessary Risk (UR) and Proposal Complexity (Variant 1) (CP) as the set of proposal metrics and three balance weight levels (specifically 0.0, 0.5 and 1.0) results in scoring strategies with the following combinations of balance weights:

Scoring Strategy 1: UR=0.0, CP=0.5
Scoring Strategy 2: UR=0.5, CP=0.0
Scoring Strategy 3: UR=0.5, CP=0.5
Scoring Strategy 4: UR=1.0, CP=0.0
Scoring Strategy 5: UR=1.0, CP=0.5
Scoring Strategy 6: UR=1.0, CP=1.0
Scoring Strategy 8: UR=0.0, CP=1.0

The scoring strategy with all weights set to zero is typically omitted, since it would produce all zero search scores. As a further optimization, when multiple scoring strategies have the same ratios between their constituent balance weights, a search only needs to be performed using one of the scoring strategies, as the scores produced by the other strategies with the same ratios will produce scores that are scalar multiples of the scores from the chosen strategy, and hence cannot discover different proposals. In the above example, only one of Strategy 3 and Strategy 6 need be performed, since the score for a given proposal in Strategy 6 will always be double the score for the same proposal in Strategy 3. Similarly, only one of Strategy 1 and Strategy 8 need be performed, and only one of Strategy 2 and Strategy 4 need be performed.

When there are L weight levels, those weight levels may be chosen to partition the range of 0.0 to 1.0 into L−1 equal sized sub-ranges (as in the above example, where 0.0, 0.5 and 1.0 are chosen as the three levels), or by some other method of non-linear division of the range. Zero does not have to be included in the selected levels. Including zero allows combinations that include each of the proposal metrics in isolation to be explored (as well as every possible subset of the chosen proposal metrics), but at the cost of generating more combinations, leading to more searches.

In this example process, the scoring strategies were processes serially, however, as will be described below, the scoring strategies are typically independent from one another. Accordingly, the scoring strategies may be processed in parallel.

Figure 4:
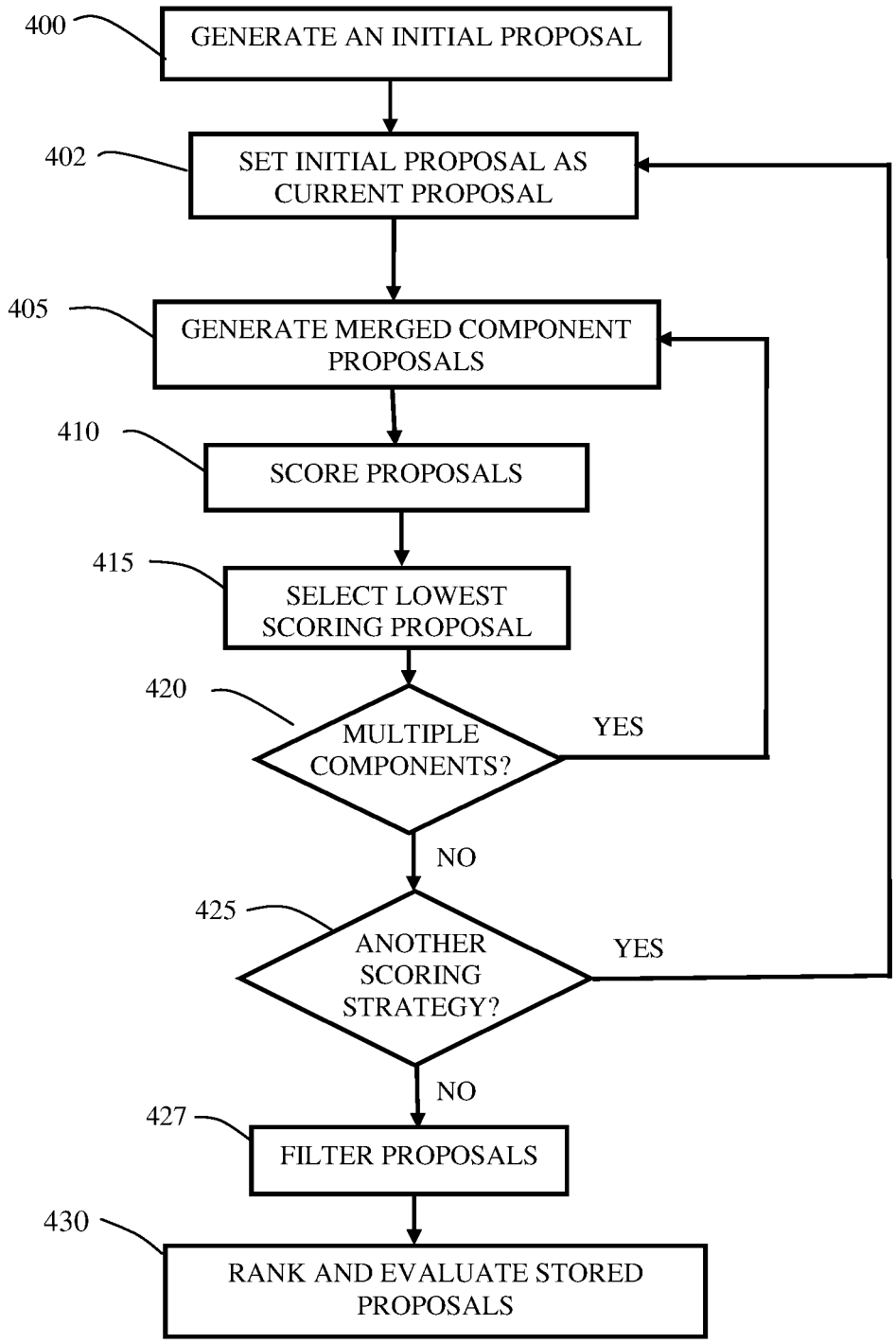
FIG. 4 is an flow chart of an alternative method of operation of the security configuration optimizer system of FIG. 1.

FIG. 4 is a flow chart of an alternative exemplary operation of the constraint optimizer system of FIG. 1. The problem of generating proposals that satisfy the provided constraints is challenging. The challenges include performing an approximate set cover. At least one solution that covers only the required authorizations can be found via a clustering method described below. Depending on the size and complexity of the configuration described by the proposal constraints, however, even if the exact solution found through clustering happens to be the optimal exact cover (which minimizes the number of covering sets used), the solution may result in a proposal with high complexity. To offer proposals with lower complexity, the proposal generator provides an approximate set cover process, in the sense that solutions are allowed to cover non-required, or optional, privileges as well as required ones. This makes many more solutions admissible, and hence significantly increases the space of possible solutions to be explored in creating a proposal set. A further challenge is that of negative constraints. The proposals generated preferably respect the required denial constraints as well as the required authorization constraints. These difficulties can be solved using the following process.

At step 400, the proposal generator generates an initial proposal that supports all the required authorizations and denials (and includes no optional authorizations). The proposal generator sets this as the current proposal. In the embodiment of the security configuration system having the usage database, the proposal generator compares the current proposal with the usage data to confirm the inclusion of required authorizations and denials.

At step 402, the proposal generator sets the initial proposal as the current proposal.

At step 405, for each pair of security configuration components (e.g. security policies) within the current proposal, the proposal generators generates a new proposal that has those two components merged into one component (so that the new proposal has one less security configuration component than the current proposal). Merging policies involves comparing policies and creating a new policy that includes all the authorizations and denials from the compared policies except where an authorization and denial conflict. In those cases, the denial defeats the authorization and the denial is included in the new policy.

At step 410, the proposal generator calculates proposal metrics and score for each proposal, on the first pass. On subsequent passes, the proposal generator calculates the metrics and score for the new proposal. Metrics and an example scoring process are described above with regard to FIG. 3.

At step 415, the proposal generator selects the proposal with the lowest score. The proposal generator stores the selected proposal as a chosen proposal for the number of security configuration components that it contains. The proposal generator also makes the selected proposal the current proposal.

At step 420, the proposal generator determines if the security configuration in the current proposal has more than one security component. If it does, the proposal generator returns to step 405. This loop is repeated until the current proposal has only one security configuration component in it.

At step 425, the proposal generator determines if there is another scoring strategy to run. If yes, the proposal generator returns to step 402. This loop repeats until all the scoring strategies have been applied.

At step 427, the proposal filter filters the proposals using the filter methods described above.

At step 430, the security configuration optimizer system ranks and evaluates the set of chosen proposals. It should be noted that each of the chosen proposals may have a different number of security configuration components. All the proposals, however, cover the required authorizations and denials. The initial proposal represents what should be the current configuration of the secured system in the it includes only required authorizations and denials. The process of repeatedly merging security configuration components reduces the complexity of each successive proposal, but trades it for adding cover of an increasing number of non-required authorizations and hence for increasing unnecessary risk. In this way, the set of generated proposals present a selection of different trade-offs unnecessary risk v. complexity.

In a first alternative embodiment of step 400, the initial proposal is represented by at least one matrix including the required authorizations and denials as well as optional authorizations. An example matrix is shown in FIGS. 5A and 5B. In the matrix, each row represents a security principal and each column represents a privilege. Each matrix element is a Boolean value. Each "1" is a required authorization. Each "2" is a required denial. Each "0" is a non-required or optional authorization. The rows or columns are then grouped according to distinct patterns of values in those rows or columns. The grouping is also referred to as "splitting". In FIG. 5A, for example, the matrix is split by rows, forming three groups. Rows E1, E4 and E5 have identical privileges, and so they form one group, which is labeled, in this case, Group 1. Row E2 is Group 2. Rows E3 and E6 are labeled Group 3. In FIG. 5B, the matrix is split by columns. Two of these columns, C1 and C5, however, have identical privileges and so, both are labeled, in this case, Group 4. Column C2 is Group 5; Column C3 is Group 6; Column C4 is Group 7; and Column C6 is Group 8.

A security configuration component (for example, a policy) is then generated for each group, which authorizes or denies those privileges which are required to be authorized or denied. Accordingly, in FIG. 5A, the security configuration component for Group 1 is Policy 1, the security configuration component for Group 2 is Policy 2, and the security configuration component for Group 3 is Policy 3. In FIG. 5B, the security component for Group 4 is Policy 4, the security component for Group 5 is Policy 5, the security component for Group 6 is Policy 6, the security component for Group 7 is Policy 7 and the security component for Group 8 is Policy 8.

Each execution of the loop of steps 400-425 is run on a plurality of scoring strategies and a plurality of splitting strategies to produce a set of proposals. The number of scoring strategies depends on the metrics and other factors described above with regard to FIG. 3. The number of splitting strategies depends on the size and content of the matrix. In this example, there are two splitting strategies. Each such execution of the loop of steps 400-425 forms one proposal tree. The trees are independent of one another and therefore may be executed in parallel.

Figure 6:
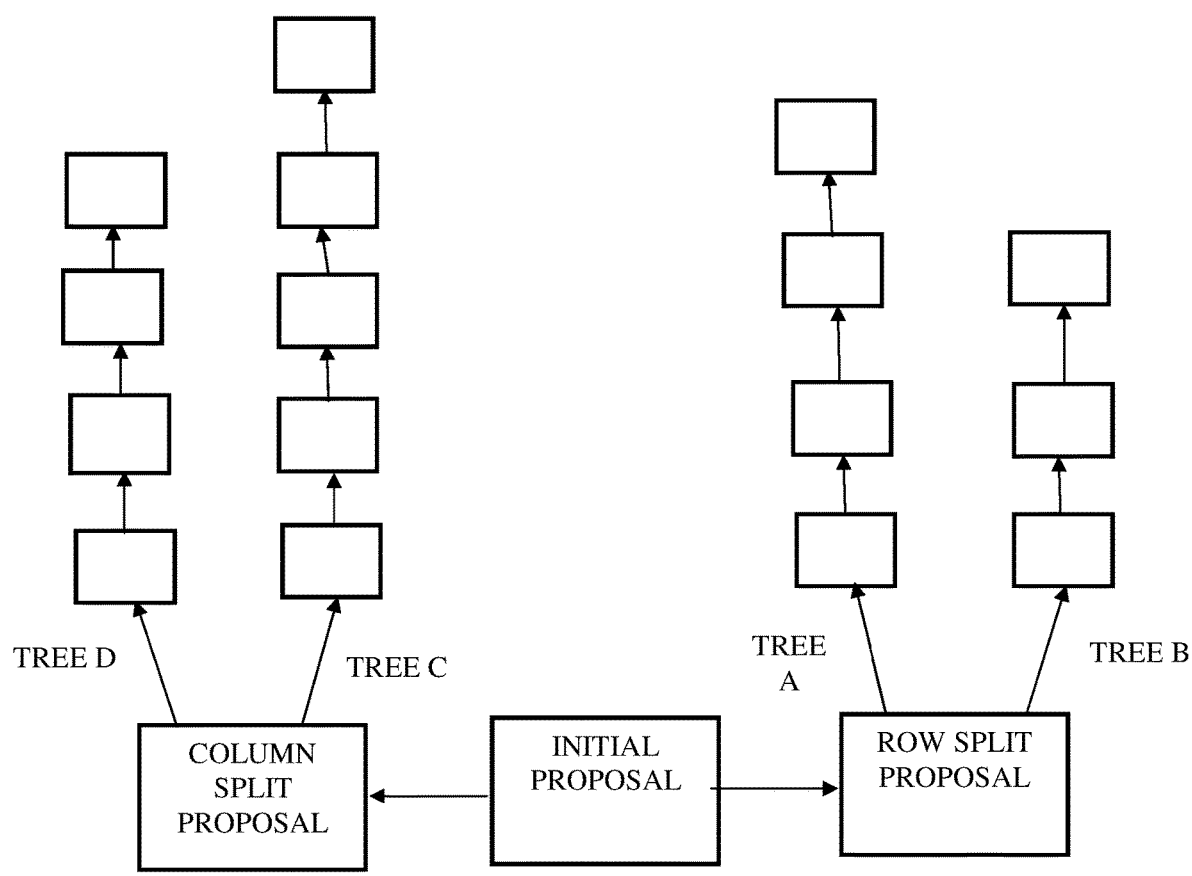
FIG. 6 is a diagram of a proposal graph created in an embodiment of the operation of the security configuration optimizer system of FIG. 1.

FIG. 6 shows an example of proposal trees generated from two splitting strategies. Operations starting with a row split proposal generate Tree A and Tree B. Operations starting with a column split proposal generate Tree C and Tree D.

In this embodiment of proposal generation, the required authorizations and denials are split across a set of policies that have no unnecessary risk. This elimination of unnecessary risk potentially comes at the cost of increased complexity (in terms of how many security configuration component instances are needed, and how complex each of the components is), and hence the proposal resulting from the split, that is, the "initial proposal" in step 400, typically represents one extreme in the range of risk v. complexity tradeoff. The subsequent iterative merge loops generates a series of proposals which trade successively lower complexity for successively more unnecessary risk, and hence represent different points in the space of risk v. complexity tradeoffs. Accordingly, the proposals higher in a proposal tree will typically have more unnecessary risk but lower complexity than those proposals lower in the tree.

Figure 7:
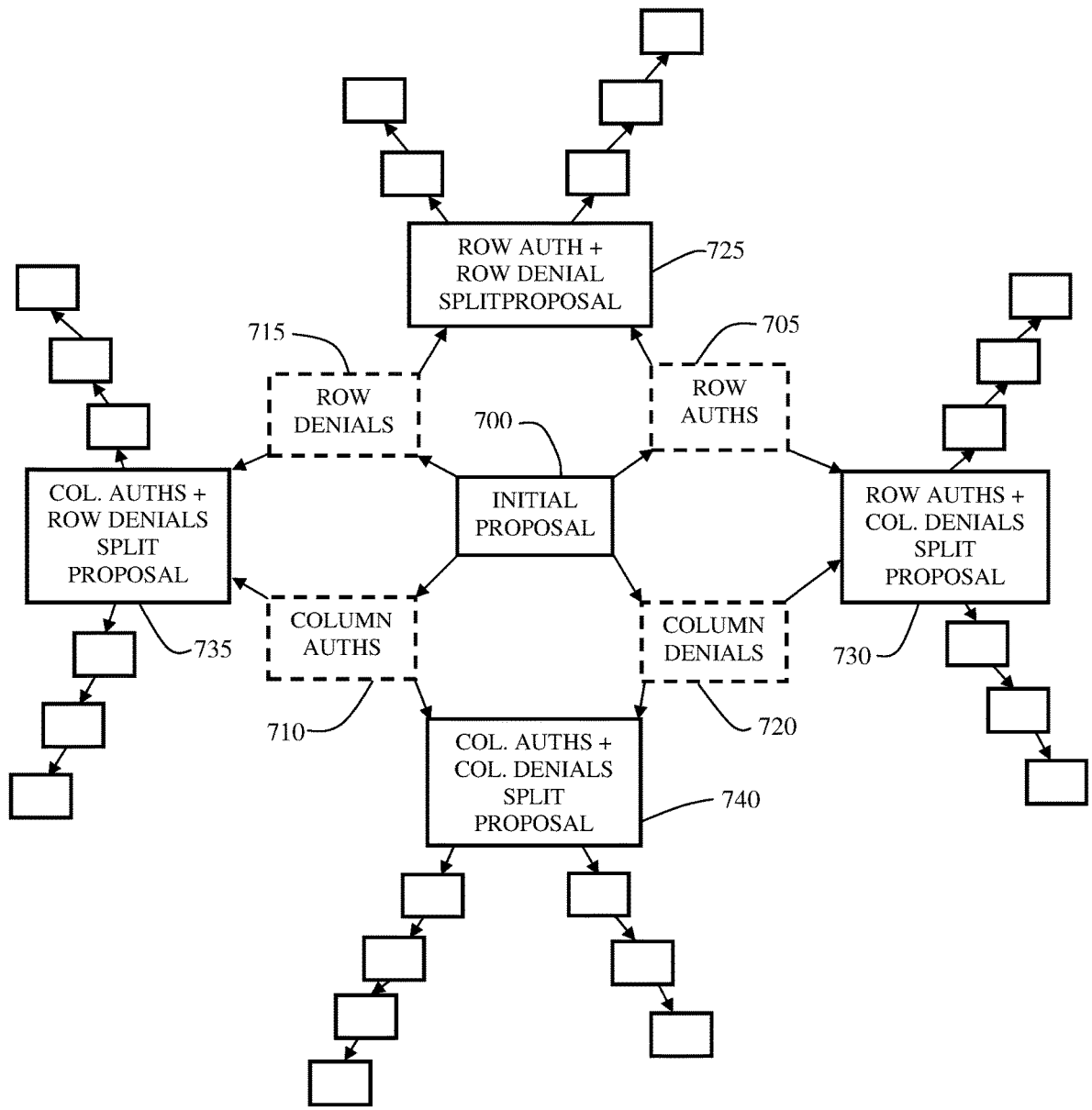
FIG. 7 is a diagram of an alternative proposal graph created in an embodiment of the operation of the security configuration optimizer system of FIG. 1.

FIG. 7 represents proposal trees generated in a system having both required authorizations and require denials. In this example, required authorizations and required denials are considered separately. That is, the required authorizations are entered into a first matrix and the required denials are entered into a second matrix. Each of the matrices is split by row and by column as described above with regard to FIG. 5. The resulting security configuration components are merged as described below.

In this example, four split proposals are generated, for the four combinations of:

row-based v. column-based split of the required authorizations, and row-based v. columns-based split for the required denials.

The four different splits (row-based for required authorizations 705 (column-based for required authorizations 710), (row-based for required denials 715) and (column-based for required denials 720) are each performed once. These splits, however, do not by themselves constitute complete proposals because the system has both required authorizations and required denials. Therefore, the splits are combined in four following combinations:

row-based required authorizations+row-based required denials 725 row-based required authorizations+column-based required denials 730 column-based required authorizations+row-based required denials 735 column-based required authorizations+column-based required denials 740

Combining two of the partial proposals is accomplished by merging (concatenating) the policies from each partial proposal.

Steps 405-425 are run on each combination of proposal scoring strategy and each splitting strategy. Each such execution forms one "proposal tree". The trees are independent of one another, and hence can be executed in parallel.

Typically there is the same set of proposal trees for each split strategy. Each tree starts with a proposal that is derived from the split proposal with which that tree is associated. The tree will have one less policy than that split proposal. This repeats, with each subsequent proposal in the proposal tree having one less policy in it than its parent proposal (the one that precedes it in the tree). The tree terminates with a proposal that has only one policy in it. Hence the length of each tree is determined by the number of policies in the split proposal from which that tree is derived. If the split proposal has 7 policies, then, the tree will have 6 proposals in it, with 6, 5, 4, 3, 2 and 1 policies in them respectively.

Figure 8:
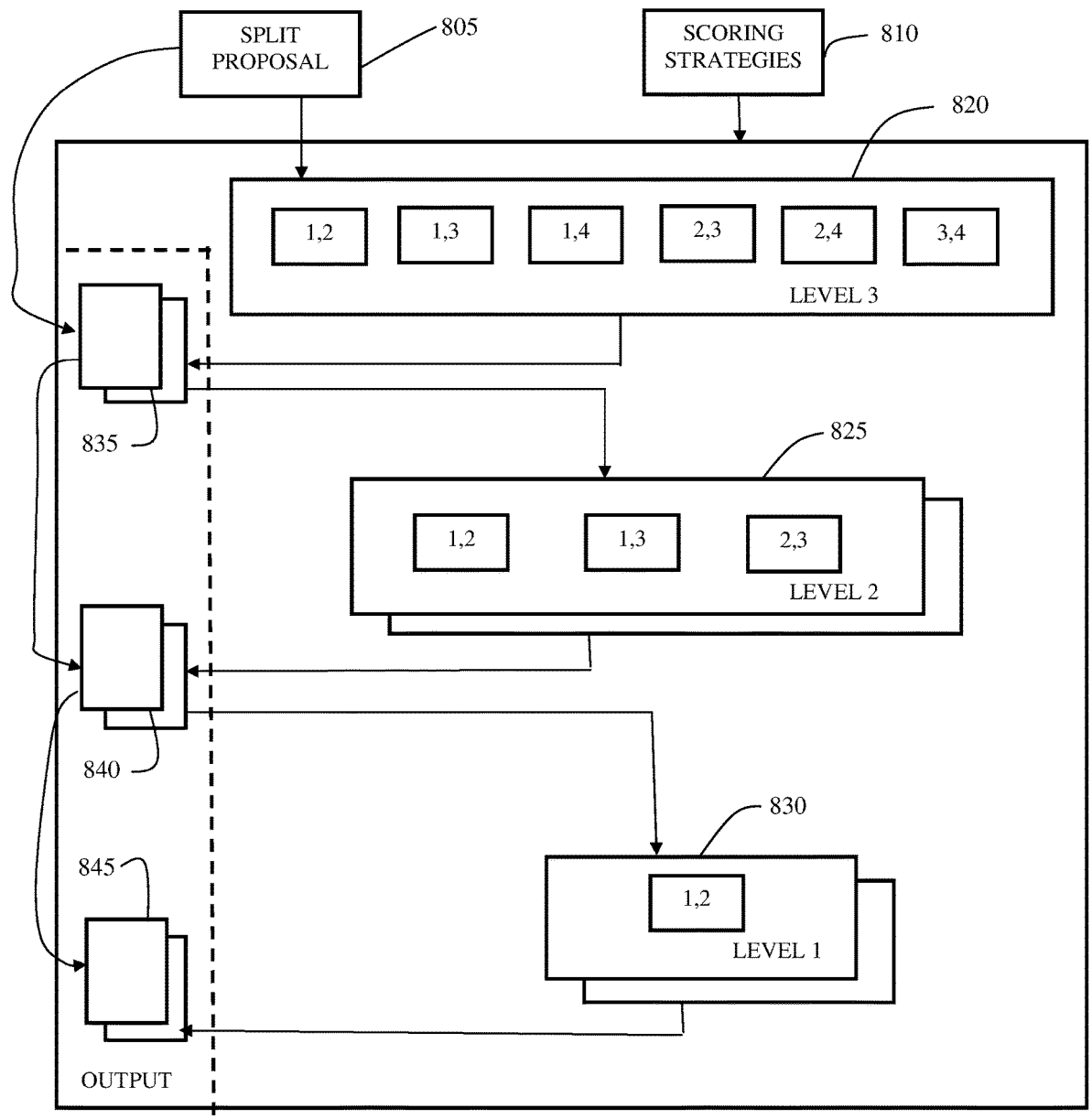
FIG. 8 is a diagram illustrating one embodiment of a method evaluating a proposal graph according to principles of the invention.

FIG. 8 illustrates the step of evaluating a proposal tree (step 430 of FIG. 4). After splitting, the inputs to one proposal tree are a split proposal 805 and a scoring strategy 810. The number of "levels" to the proposal tree is a function of the number of polices in the split proposal. If the split proposal has P policies in it, the tree will have P−1 levels. In FIG. 8, the split proposal has, for example, four policies, and hence there are three levels 820, 825, 830 to the tree.

The tree is evaluated from level P−1 down to level 1, iteratively. For each iteration, the proposal generator takes the current best proposal from the previous level (or the split proposal for the initial level, P−1) and generates a set of candidate proposals (each with P−1 proposals), by considering all the combinations of two policies within the current best proposal and merging them. So, in the case illustrated in FIG. 8 the first iteration (for Level 3) uses the split proposal 805 as the current best. It has four policies, so the combinations of pairs of policies that can be merged are (1,2) (1,3) (1,4) (2,3) (2,4) and (3,4).

A candidate proposal is produced for each merge. The metrics are computed for each candidate proposal, and then they are scored, using a selected scoring strategy. The candidate proposal with the lowest score is saved as the tree's best proposal for Level 3 835. The Level 3 best proposal 835 becomes the first proposal in this tree. It is linked as a child of the split proposal 805. Proposal 835 also becomes the current proposal to be used for the next iteration.

The second iteration (for Level 2) makes candidate proposals for all combinations of policies within the current proposal. Since it has three policies, the combinations are: (1,2) (1,3) (2,3). As before, the metrics and score are calculated for each candidate proposal. The candidate proposal with the lowest score is saved as "best proposal for Level 2" 840 and becomes the second proposal in this tree (part of the proposal tree's output). The Level 2 best proposal 840 is linked as a child of the best proposal 835 from the first iteration. Proposal 840 also becomes the current proposal for the next iteration.

The third iteration (for Level 1) is presented with a current proposal with only two policies, so there is only one way to merge them (1,2) and only one proposal that is a candidate for the level's "best proposal". Therefore, this proposal 845 becomes the tree's "best proposal for Level 1" (part of the proposal tree output), and is linked to as a child of the best proposal from the second iteration. It also becomes the current proposal. The tree terminates, because a current proposal with one policy in it has been reached, and no further merging is possible.

It is possible for two or more candidate proposals in the same iteration to have the same score. There are a number of alternatives in choosing the best proposal. Typically one is chosen and the remaining proposals are ignored. The choice can be made in many ways, for example by choosing the first encountered, or by choosing the last encountered, or by choosing at random. More alternative methods of handling two or more candidate proposals having the same score are described below with regard to FIG. 9.

Figure 9:
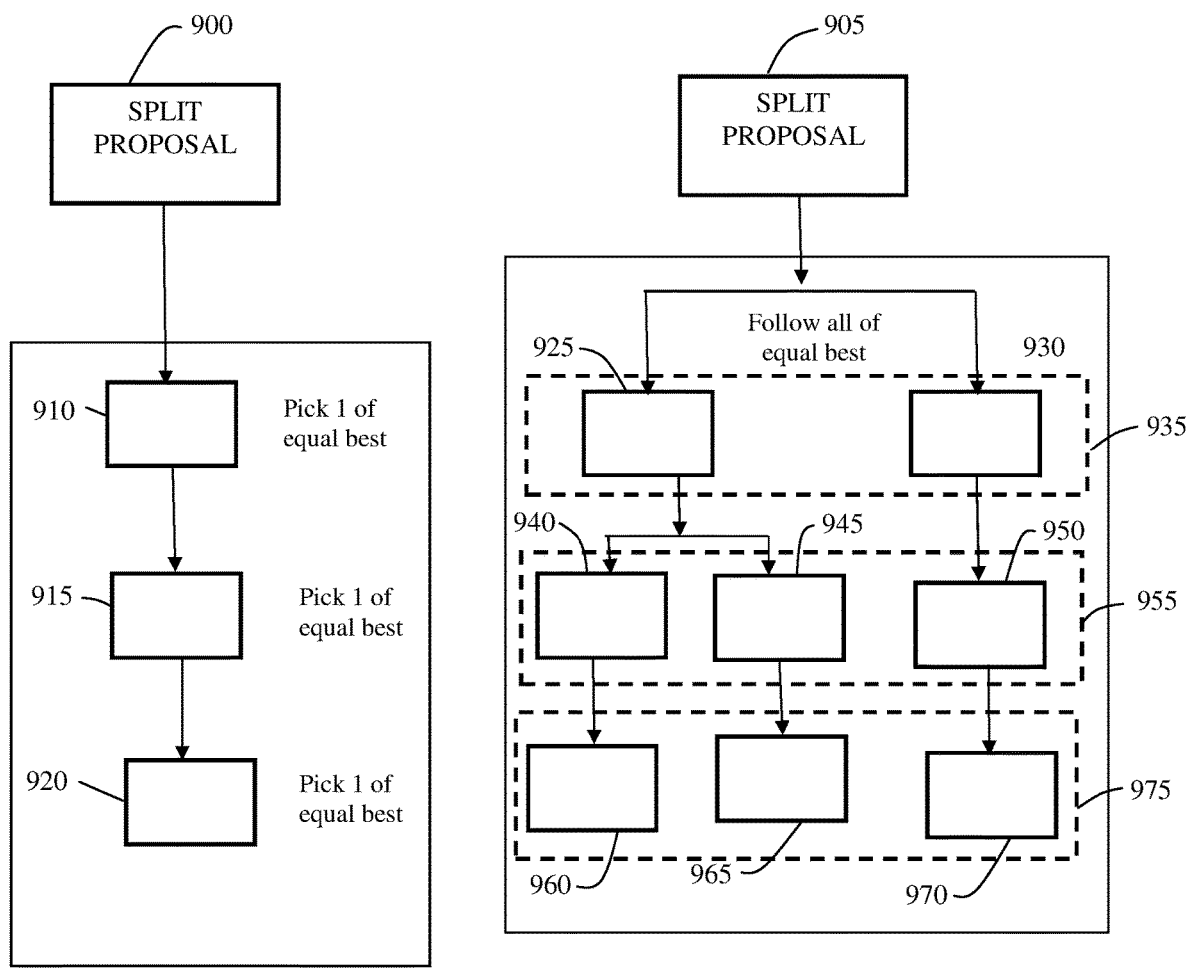
FIG. 9 illustrates executing a forked proposal tree according to principles of the invention.

FIG. 9 shows a first and a second forked tree where each has equal-best proposals. The first forked tree 900 has (or has picked) only one best proposal 910, 915, 920 per iteration/level. The second forked tree 905 shows a case where the first evaluation iteration had two equal best proposals 925, 930 for Level 3 935. Equal best proposal 925 also leads to equal best proposals 940, 945 in iteration 2 (level 2) 950, so the tree again forks. Neither fork can again fork in iteration 3 (level 1) 955, as there is only one way to merge a proposal with two policies down into one with one policy (merge policy 1 and policy 2, also referred to as "(1,2)").

One embodiment of a method for executing the forked tree 905 is as follows. For each iteration, the proposal generator makes a set of proposals the "best proposal" rather than naming a single proposal as the "best proposal". The set is populated with all candidate proposals for that iteration that have the equal best (that is, lowest) score. As each iteration completes, the proposal generator chooses one proposal from the best proposal set for the current level, and uses that as the input for the next iteration, at level L−1. This means that the (possibly forking) tree is explored in a depth first fashion. After an iteration is explored for Level 3, the next iteration will explore a fork for Level 2, and the one after that a fork for Level 1.

When an iteration finishes for Level 1, if the best proposal set for Level 2 is not empty, the next iteration can take another (previously unchosen) Level 2 best proposal, and run another fork of Level 3. If all the Level 2 best proposals have been chosen before, the Level 3 best proposals are checked. Generally, if all of the best proposals at level L have been tried as input to an iteration, the best proposals for Level L+1 are checked for ones that have not been chosen yet. This repeats up to the highest level for the tree.

This process can be repeated until all the best proposals at all levels have been tried. But a time limit or maximum number of forks or proposals can also be imposed, and used to terminate the evaluation of more forks.

Embodiments of the security configuration optimizer system further include a proposal validator. In some embodiments of the security configuration optimizer system, the proposal validator is an independent component inside the system. In other embodiments, the proposal validator is part of the proposal generator. Each generated proposal is validated to ensure that provided constraints are covered. The benefit of an independent proposal validator is that it can then be called directly (not via the proposal generator). This is advantageous in validation of proposed changes offered by users or other systems.

Proposal trees could be embodied in an alternative way, that is, as a graph. Specifically, an alternative embodiment could be a directed acyclic graph (DAG), where the direction of the edges is from a parent proposal (at level L—i.e. having L policies in the proposal) to each child proposal at level L−1 (having L−1 policies per proposal). In the current embodiment, no two parent proposals (from different forks of the tree) point to the same child proposal (at which point it would cease to be a tree, and become a DAG), because proposal fingerprinting is used to detect that a given proposal has been generated on a different branch of the tree, and a second instance of the proposal is disregarded. (This works because a given tree is scored with only one scoring strategy, and hence the output of further merging a proposal with a given fingerprint will be the same each time the different possible merges are examined (it is deterministic). In the embodiment using a graph/DAG, fingerprinting would still be used to discover the existing proposal on another branch to which a connection will then be made. In still further alternative embodiment, the number of edges connecting into a proposal could be factored into considering how good that proposal is. Preferably, the proposal is marked when it is evaluated, in order to avoid duplicate evaluation.

It is to be understood that the above-identified embodiments are simply illustrative of the principles of the invention. Various and other modifications and changes may be made by those skilled in the art which will embody the principles of the invention and fall within the spirit and scope thereof.

The invention claimed is:

1. A computer implemented method for configuring a secured system, the method comprising:
generating a first plurality of proposals for a security configuration for the secured system, each proposal in the first plurality including required privileges for accessing the secured system by at least one principal, at least one proposal of the first plurality having only required privileges and remaining proposals of the first plurality having required privileges and optional privileges;
scoring each proposal in the first plurality of proposals, a score to indicate a proposal fitness, the proposal fitness representing a level of risk to the security configuration according to the optional privileges;
filtering the first plurality of proposals according to the proposal fitness of each proposal to produce a second plurality of proposals, where proposals in the second plurality are fewer in number than proposals in the first plurality;
evaluating, using proposal metrics related to the proposal fitness, each proposal in the second plurality of proposals for risk and complexity to produce a third plurality of proposals; and
selecting a proposal from the third plurality of proposals to implement in the secured system, the selected proposal representing maximal access by the at least one principal with minimal risk to the secured system, where the selected proposal from the third plurality of proposals includes only required privileges for the at least one principal and no optional privileges, and the selection is executed using one or more fork trees among the third plurality of proposals, each of the one or more fork trees being used to define a first set of the third plurality of proposals, score each proposal in the first set of the third plurality of proposals based on a policy included in each proposal, randomly choose two of the third plurality of proposals to be compared, choose one of the two of the third plurality of proposals for evaluation against a next proposal of the third plurality of proposals, and select the proposal from the third plurality of proposals according to the score to implement in the secured system.

2. The computer implemented method of claim 1 wherein the generating a first plurality of proposals step further comprises generating the first plurality of proposals from a plurality of constraints on the at least one principal.

3. The computer implemented method of claim 1 wherein the generating a first plurality of proposals step further comprises generating the first plurality of proposals from usage data of the secured system.

4. The computer implemented method of claim 1 wherein the step of the filtering further comprises a plurality of filters that are executed sequentially.

5. The computer implemented method of claim 1 wherein the step of the filtering further comprises a plurality of filters that are executed in parallel.

6. The computer implemented method of claim 1 further comprising ranking the second plurality of proposals.

7. The computer implemented method of claim 6 wherein the ranking is executed according to ranking metrics selected from the group consisting of unnecessary risk, complexity according to number of path rules, complexity according to number of policies and proposal coherence.

8. The computer implemented method of claim 6 wherein the ranking is executed according to a metric developed from usage data of the secured system.

9. The computer implemented method of claim 1 wherein the selecting a proposal from the third plurality further comprises selecting a proposal having a particular score.

10. The computer implemented method of claim 1 wherein the scoring further comprises scoring according to unnecessary risk included in each proposal in the first plurality of proposals.

11. A non-transitory computer-readable storage medium storing a computer program, that when executed by at least one processor causes the at least one processor to perform a method for configuring a secured system, the method comprising:
generating a first plurality of proposals for a security configuration for the secured system, each proposal in the first plurality including required privileges for accessing the secured system by at least one principal, at least one proposal of the first plurality having only required privileges and remaining proposals of the first plurality having required privileges and optional privileges;
scoring each proposal in the first plurality of proposals, score to indicate proposal fitness, the proposal fitness representing a level of risk to the security configuration according to the optional privileges;
filtering the first plurality of proposals according to the proposal fitness of each proposal to produce a second plurality of proposals, where proposals in the second plurality are fewer in number than proposals in the first plurality;
evaluating, using the proposal scores related to the proposal fitness, each proposal in the second plurality of proposals for risk and complexity to produce a third plurality of proposals; and
selecting a proposal from the third plurality of proposals to implement in the secured system, the selected proposal representing maximal access by the at least one principal with minimal risk to the secured system, where the selected proposal from the third plurality of proposals includes only required privileges for the at least one principal and no optional privileges, and the selection is executed using one or more fork trees among the third plurality of proposals, each of the one or more fork trees being used to define a first set of the third plurality of proposals, score each proposal in the first set of the third plurality of proposals based on a policy included in each proposal, randomly choose two of the third plurality of proposals to be compared, choose one of the two of the third plurality of proposals for evaluation against a next proposal of the third plurality of proposals, and select the proposal from the third plurality of proposals according to the score to implement in the secured system.

12. The non-transitory computer-readable storage medium of claim 11 wherein the generating a first plurality of proposals step further comprises generating the first plurality of proposals from a plurality of constraints on the at least one principal.

13. The non-transitory computer-readable storage medium of claim 11 wherein the generating a first plurality of proposals step further comprises generating the first plurality of proposal from usage data of the secured system.

14. The non-transitory computer-readable storage medium of claim 11 wherein the step of the filtering further comprises a plurality of filters that are executed sequentially.

15. The non-transitory computer-readable storage medium of claim 11 wherein the step of the filtering further comprises a plurality of filters that are executed in parallel.

16. The non-transitory computer-readable storage medium of claim 11 further comprising ranking the second plurality of proposals.

17. The non-transitory computer-readable storage medium of claim 16 wherein the ranking is executed according to ranking metrics selected from the group consisting of unnecessary risk, complexity according to number of path rules, complexity according to number of policies and proposal coherence.

18. The non-transitory computer-readable storage medium of claim 16 wherein the ranking is executed according to a metric developed from usage data of the secured system.

19. The non-transitory computer-readable storage medium of claim 11 wherein the selecting a proposal from the third plurality further comprises selecting a proposal having a particular score.

20. The non-transitory computer-readable storage medium of claim 11 wherein the scoring further comprises scoring according to unnecessary risk included in each proposal in the first plurality of proposals.

* * * * *